(12) United States Patent
de Silva et al.

(10) Patent No.: US 11,175,792 B2
(45) Date of Patent: Nov. 16, 2021

(54) SYSTEMS AND METHODS FOR INTERACTIVE CONVERSATIONAL GRAPHICAL USER INTERFACES

(71) Applicant: TruVerse, Inc., Los Altos, CA (US)

(72) Inventors: Mahi de Silva, Los Altos Hills, CA (US); Manoj Malhotra, Los Altos, CA (US)

(73) Assignee: TruVerse, Inc., Los Altos, CA (US)

( * ) Notice: Subject to any disclaimer, the term of this patent is extended or adjusted under 35 U.S.C. 154(b) by 0 days.

(21) Appl. No.: 16/808,250

(22) Filed: Mar. 3, 2020

(65) Prior Publication Data

US 2020/0285372 A1    Sep. 10, 2020

Related U.S. Application Data

(60) Provisional application No. 62/815,776, filed on Mar. 8, 2019.

(51) Int. Cl.
*G06F 3/0481*    (2013.01)
*G06Q 30/02*    (2012.01)
(Continued)

(52) U.S. Cl.
CPC ...... *G06F 3/04817* (2013.01); *G06F 3/04886* (2013.01); *G06N 20/00* (2019.01);
(Continued)

(58) Field of Classification Search
CPC .............. H04L 51/02; G06Q 30/0271; G06Q 30/0255; G06Q 30/02; G06N 20/00
See application file for complete search history.

(56) References Cited

U.S. PATENT DOCUMENTS

| 8,000,454 B1 | 8/2011 | Or-Bach et al. |
| 9,100,478 B1 | 8/2015 | Benway et al. |

(Continued)

FOREIGN PATENT DOCUMENTS

| WO | WO2018005087 A1 | 1/2018 |
| WO | WO2018031765 A1 | 2/2018 |

OTHER PUBLICATIONS

"International Search Report" and "Written Opinion of the International Searching Authority" dated Jul. 6, 2017 in Patent Cooperation Treaty Application No. PCT/US2017/037349, filed Jun. 13, 2017, 12 pages.

(Continued)

*Primary Examiner* — Mong-Shune Chung
(74) *Attorney, Agent, or Firm* — Carr & Ferrell LLP (57) ABSTRACT

Provided herein are exemplary systems, methods and interactive conversational graphical user interfaces, including a networked computing device comprising a processor and a display screen, the computing device configured to dynamically display a specific, structured interactive conversational graphical user interface paired with a prescribed functionality directly related to the interactive conversational graphical user interface's structure. The networked computing device may be a networked server having a processor and communicatively coupled to the computing device, the networked server including a user identification mechanism to identify a user of the networked computing device. The networked server may further include a profile for the user and a sponsorship engine configured to send an advertising icon to the user.

7 Claims, 6 Drawing Sheets

(51) Int. Cl.
*H04L 12/58* (2006.01)
*G06N 20/00* (2019.01)
*G06F 3/0488* (2013.01)

(52) U.S. Cl.
CPC ..... *G06Q 30/0255* (2013.01); *G06Q 30/0271* (2013.01); *H04L 51/02* (2013.01)

(56) References Cited

U.S. PATENT DOCUMENTS

| | | |
|---|---|---|
| 9,948,778 B2 | 4/2018 | de Silva et al. |
| 2004/0117444 A1 | 6/2004 | Goodman et al. |
| 2006/0026254 A1 | 2/2006 | Kessen et al. |
| 2008/0147406 A1 | 6/2008 | Da Palma et al. |
| 2009/0181702 A1 | 7/2009 | Vargas et al. |
| 2010/0287226 A1 | 11/2010 | Wright et al. |
| 2010/0296638 A1 | 11/2010 | Wang |
| 2012/0059896 A1 | 3/2012 | Li |
| 2012/0209673 A1* | 8/2012 | Park ............ G06Q 30/02 705/14.15 |
| 2013/0030993 A1 | 1/2013 | Peace et al. |
| 2013/0073636 A1 | 3/2013 | Zhu et al. |
| 2014/0122053 A1 | 5/2014 | Lotan et al. |
| 2014/0122407 A1 | 5/2014 | Duan |
| 2014/0279050 A1* | 9/2014 | Makar ............ G06N 20/00 705/14.66 |
| 2015/0172463 A1 | 6/2015 | Quast et al. |
| 2015/0186156 A1 | 7/2015 | Brown et al. |
| 2015/0215455 A1 | 7/2015 | Perotti et al. |
| 2015/0249629 A1 | 9/2015 | Denenberg et al. |
| 2016/0094492 A1 | 3/2016 | Li et al. |
| 2016/0094507 A1 | 3/2016 | Li et al. |
| 2016/0149839 A1 | 5/2016 | Yi et al. |
| 2016/0360037 A1 | 12/2016 | Van Rensburg et al. |
| 2017/0374198 A1 | 12/2017 | de Silva et al. |
| 2018/0025726 A1 | 1/2018 | Gatti de Bayser et al. |
| 2018/0027395 A1 | 1/2018 | Gupta et al. |
| 2018/0048594 A1 | 2/2018 | de Silva et al. |
| 2018/0219921 A1* | 8/2018 | Baer ............ H04L 51/16 |
| 2018/0343214 A1 | 11/2018 | Shen |

OTHER PUBLICATIONS

"International Search Report" and "Written Opinion of the International Searching Authority" dated Oct. 17, 2017 in Patent Cooperation Treaty Application No. PCT/US2017/046288, filed Aug. 10, 2017, 9 pages.

Nelissen, Niko, "How bot-to-bot could soon replace APIs", <https://venturebeat.com/2016/06/05/how-bot-to-bot-could-soon-replace-apis/>, Jun. 5, 2015, 5 pages.

* cited by examiner

SYSTEMS AND METHODS FOR INTERACTIVE CONVERSATIONAL GRAPHICAL USER INTERFACES

CROSS REFERENCE TO RELATED APPLICATIONS

This application claims the priority benefit of U.S. Provisional Application Ser. No. 62/815,776 filed on Mar. 8, 2019, titled "Systems and Methods for an Interactive Conversational Graphical User Interface," which is hereby incorporated by reference.

FIELD OF INVENTION

The present technology pertains to systems and methods for interactive conversational graphical user interfaces.

SUMMARY

Provided herein are exemplary systems, methods and interactive conversational graphical user interfaces, including a networked computing device comprising a processor and a display screen, the computing device configured to dynamically display a specific, structured interactive conversational graphical user interface paired with a prescribed functionality directly related to the interactive conversational graphical user interface's structure. The networked computing device may be a networked server having a processor and communicatively coupled to the computing device, the networked server including a user identification mechanism to identify a user of the networked computing device. The networked server may further include a profile for the user and a sponsorship engine configured to send an advertising icon to the user.

According to further exemplary embodiments, the networked server is configured to send a personalized icon to the user and may also include an engine configured to send content to the user. In most exemplary embodiments, the networked server is configured with a machine learning engine to track every interaction the user has with the content and icons and to build a deep profile for the user. The machine learning engine may also track the interactions of other users with the content. The networked server may also periodically send related content to the users via a messaging application.

The structure, according to various exemplary embodiments, is configured to receive a user response. The user response may represent a textual response or a voice response. The prescribed functionality may utilize natural language processing. The natural language processing may cause transformation of the textual response into a specifically dynamic visually or audibly perceptible and responsive answer. The responsive answer can automatically be sent to the user's messenger or email account. The responsive answer can also be automatically sent to another computing device owned by the user. Moreover, the responsive answer can automatically be sent to either computing device after it has been shut down for an extended period of time (e.g. 24 hours) and then re-booted.

In yet further exemplary embodiments, the responsive answer, additional user textual or audible responses and additional responsive answers can be synchronized and searchable between both computing devices. Moreover, each responsive answer, additional user textual or audible responses and additional responsive answers causes the server to provide quicker and more accurate responsive answers.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Brands and marketers have a dilemma, which is their control of paid advertising. Brand chatter shows up on Facebook, YouTube, TripAdvisor, etc. If brands and marketers can manage or harness brand chatter, it can draw better revenue, better loyalty, and better brand equity. For example, a user may see an ad for a particular company on a news feed, click on the ad, and comment that they had a really bad experience with that particular company. This is visible to the entire community, including everyone viewing the ad.

Accordingly, brand engagement is a complex problem, and the current tool set is to employ humans that look at all of these posts, and try to respond. The problem is that humans are unable to respond to the vast majority of the posts. The exemplary embodiments shown herein are scalable and solve this problem. It is an artificially intelligent ("AI") driven platform that can support a brand and touchpoints with customers on any surface or on any application. This could be on a mobile application, mobile web, desktop web, etc. This could also be within Facebook Messenger, Google, Google Search, etc. The exemplary embodiments herein use machines and to offload as much of a conversation before it gets to a human, and quite often, they are capable satisfying a lot of the need without ever escalating to a human.

Another point of differentiation is that internet chats with a company end when the window closes. It disappears. The exemplary embodiments herein allow for persistent conversations. One can start a conversation on a desktop machine in the morning, get involved in another activity and go back at night to their phone or on a social messaging service and maintain the conversation.

Advantageously, the systems and methods described and illustrated herein include methods for interacting with a human to a source of artificial intelligence. It is a method for effectively utilizing "real estate space" on a display, including a limited mobile computing display. It is a method for delivering advertising. It is a method for encouraging and engaging conversational experiences that persist and follow the user and/or consumer.

Another advantage of the systems and methods described and illustrated herein: big brands have spent lots of money building mobile applications that most consumers do not take the time to download or have space for on their mobile device. The systems and methods herein bypass the need to download a mobile application. It represents a technical solution to a technical problem. In addition to a person not having to download an application, the person may interact with it while on top of other content, and it is customizable. It is also automatically synchronized between multiple computing devices such as a user/consumer's mobile phone and laptop computer, remains persistent and may be searched by the user/consumer.

Figure 1:
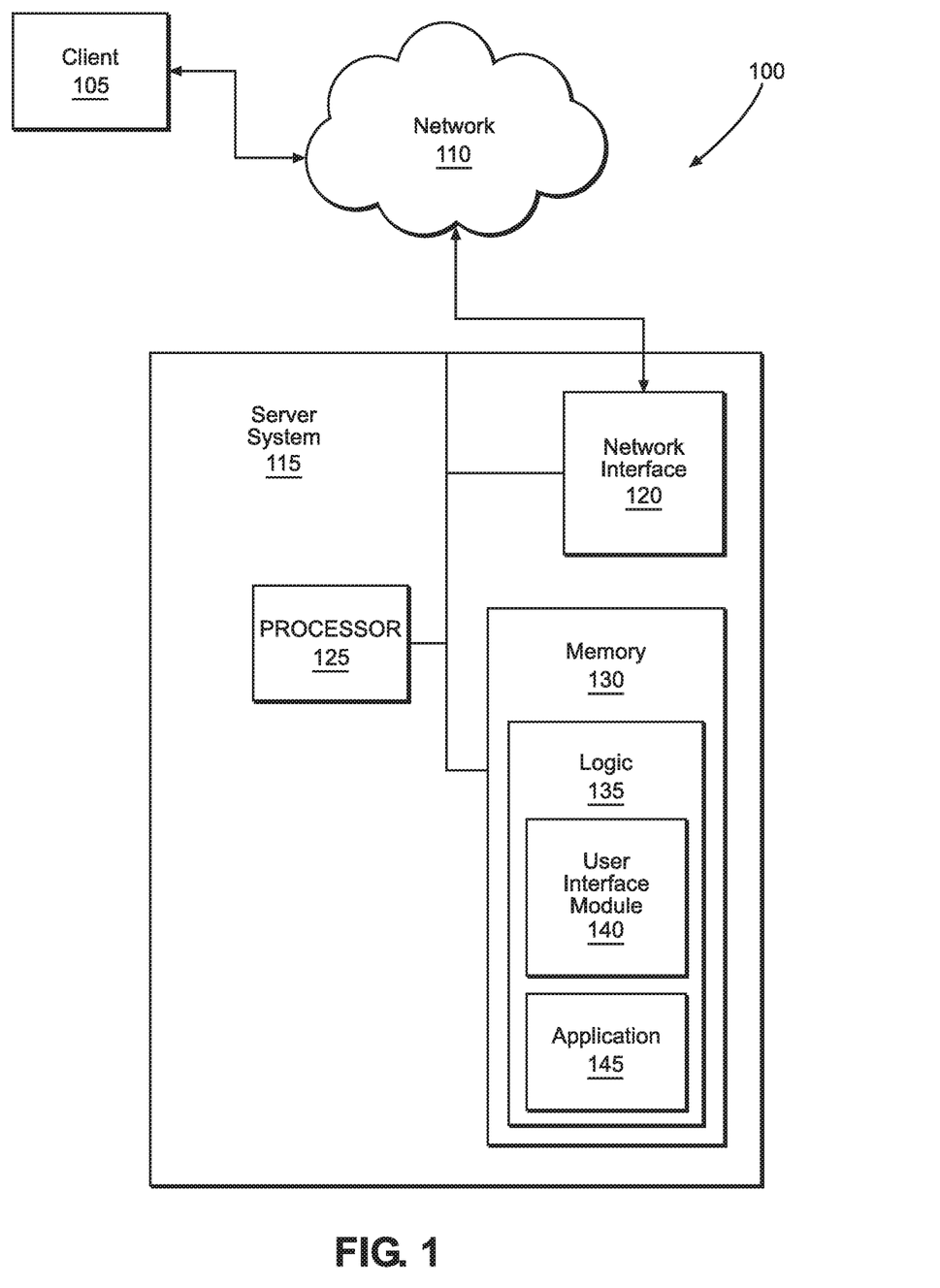
FIG. 1 is an exemplary system that can be used to practice aspects of the present technology.

FIG. 1 illustrates an exemplary architecture 100 for practicing aspects of the present technology. The architecture comprises a server system, hereinafter "system 115" that is configured to provide various functionalities, which are described in greater detail throughout this document. Generally, the system 115 is configured to communicate with client devices, such as client 105.

The system 115 may communicatively couple with the client 105 via a public or private network, such as network 110. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 115 generally comprises a processor, 125, a network interface 120, and a memory 130. According to some embodiments, the memory 130 comprises logic (e.g., instructions) 135 that can be executed by the processor 125 to perform various methods. For example, the logic may include a user interface module 140 as well as a data aggregation and correlation application (hereinafter application 145) that is configured to provide the functionalities described in greater detail herein.

It will be understood that the functionalities described herein, which are attributed to the system 115 and application 145, may also be executed within the client 105. That is, the client 105 may be programmed to execute the functionalities described herein. In other instances, the system 115 and client 105 may cooperate to provide the functionalities described herein, such that the client 105 is provided with a client-side application that interacts with the system 115 such that the system 115 and client 105 operate in a client/server relationship. Complex computational features may be executed by the system 115, while simple operations that require fewer computational resources may be executed by the client 105, such as data gathering and data display.

In general, the user interface module 140 may be executed by the system 115 to provide various interactive conversational graphical user interfaces (GUIs) that allow users to interact with the system 115. In some instances, GUIs are generated by execution of the application 145 itself. Users may interact with the system 115 using, for example, a client 105.

Figure 2:
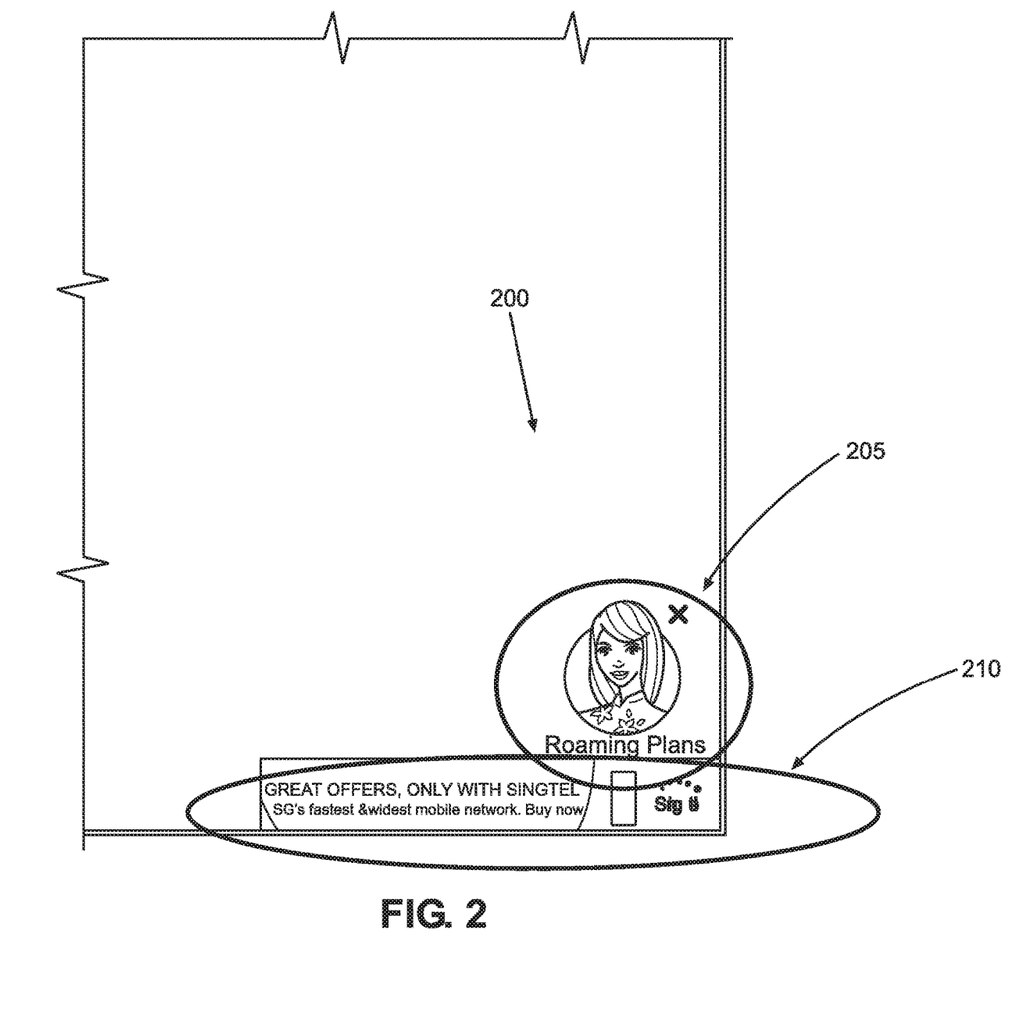
FIG. 2 is a first exemplary view of an interactive conversational graphical user interface.

FIG. 2 is a first exemplary view of an interactive conversational graphical user interface 200. Shown are personalized icon 205, targeted advertisement ("ad") 210, and an "X" to make the personalized icon 205 and/or targeted ad 210 disappear. According to exemplary embodiments, an ad unit can be of any format (static image, GIF, video, etc.) and can be of any size specified by the publisher and/or advertiser. It originates from the exemplary systems herein. When a consumer clicks on the ad unit, the consumer is directed to another screen such as that shown in FIG. 3.

According to some exemplary embodiments, a user may access a website where the user is identifiable through such mechanisms as a cookie, log-in, pixel, etc. As such, an icon can be personalized for the user, such as personalized icon 205. The website may also have a profile for the user, which will enhance both personalization and the targeting of ads, such as targeted ad 210. In some exemplary embodiments, the website may have a sponsor, such as Toyota®, and the targeted ad might be a dynamic view of an animated Toyota® vehicle. Thus, a user may be targeted based on a personal profile, identifier and/or a sponsorship engine for the website.

Figure 3:
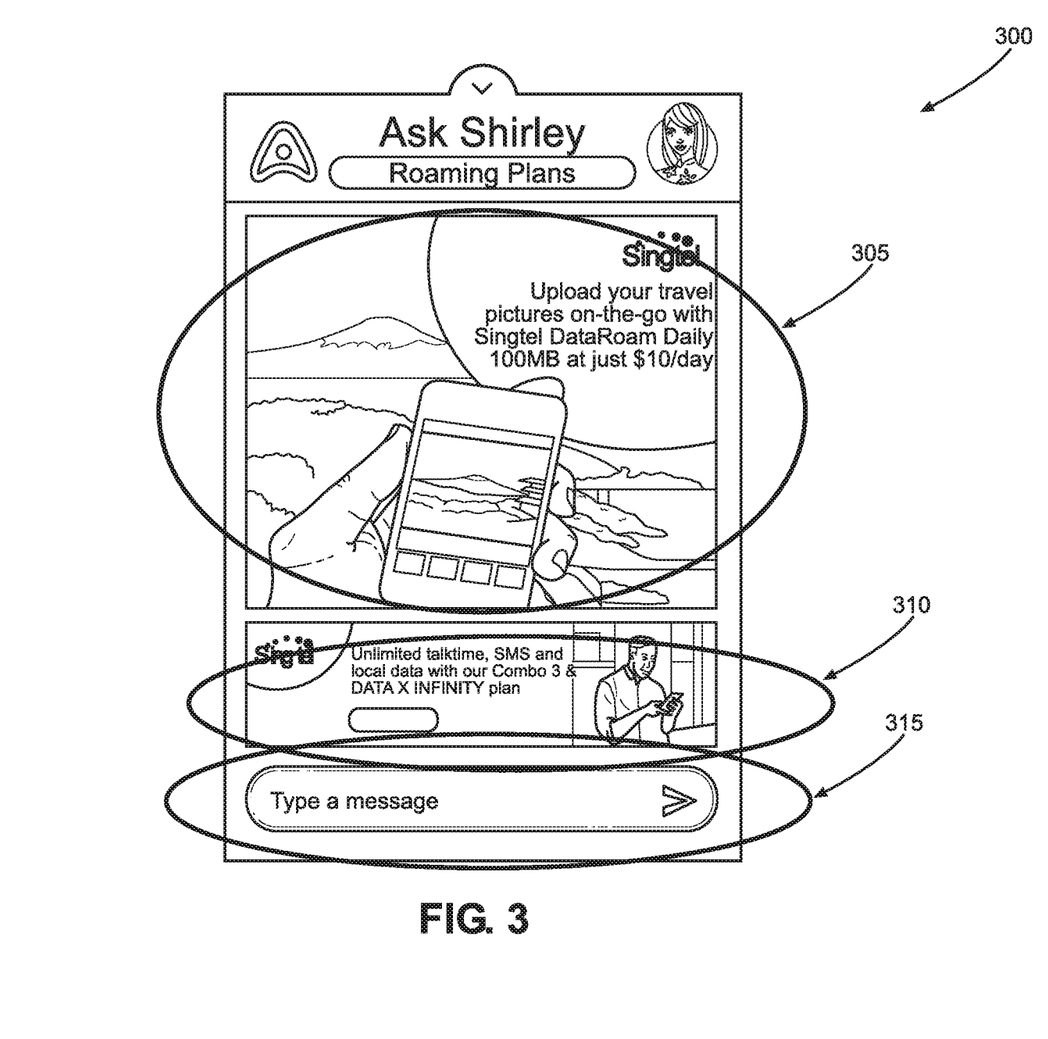
FIG. 3 is a second exemplary view of an interactive conversational graphical user interface.

FIG. 3 is a second exemplary view of an interactive conversational graphical user interface 300. Shown are personalized icon 305, targeted ad 310 and chat experience 315.

In most exemplary embodiments, almost every interaction a user and/or consumer has with an icon, content and/or chat experience on a website, a machine learning engine builds a deeper profile of the consumer and/or user. For example, if a user is accessing a news oriented website with viewing options and clicks on "sports," the machine learning engine will score the user's profile and know the user is interested in sports. If the user later returns to view sports again, the machine learning engine will score the user's profile higher for sports. Additionally, the machine learning engine may also take into account what a community of viewers of the website are viewing and/or interacting with on the website in order to determine what content to deliver to any particular user.

Figure 4:
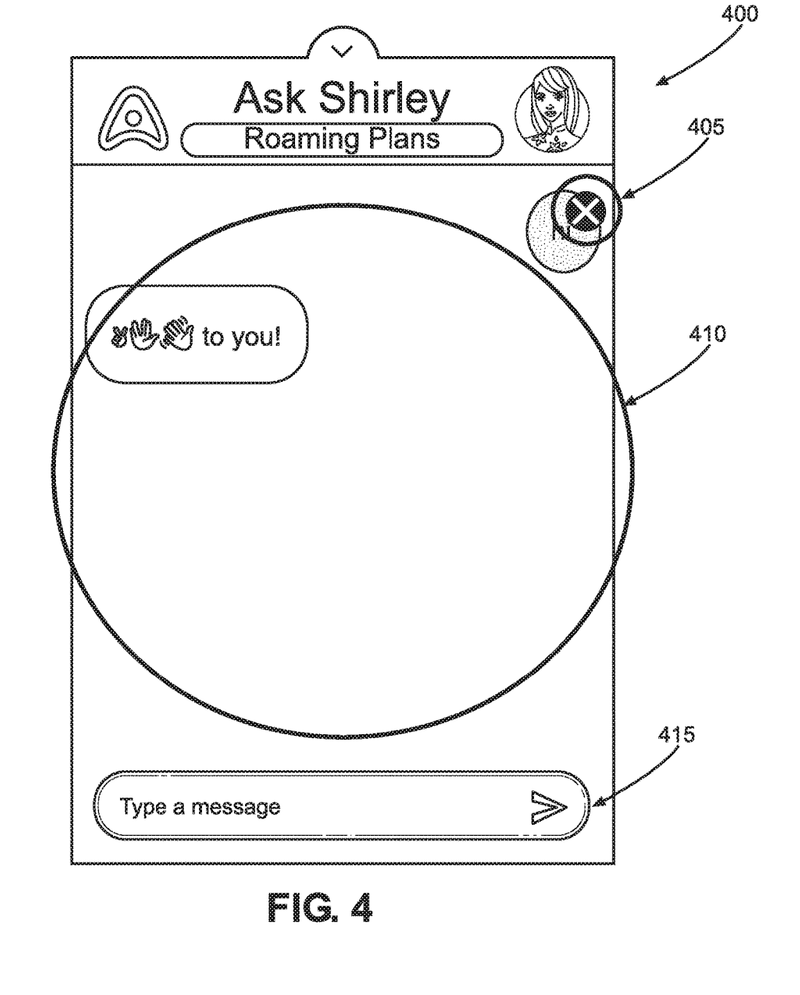
FIG. 4 is a third exemplary view of an interactive conversational graphical user interface.

Referring again to FIG. 3, when a consumer interacts (e.g., types a message) with the screen as shown in FIG. 3, the ad(s) may disappear, and the consumer may be directed to another screen such as that shown in FIG. 4.

FIG. 4 is a third exemplary view of an interactive conversational graphical user interface 400. Shown are an "X" escape icon 405, conversation space 410 and chat experience 415.

In various exemplary embodiments, when a user starts to type a message in the chat experience 415, natural language programming ("NLP") is capable of understanding the user's message and, in some cases, sentiment. In response, the appropriate feedback may be generated for the user. At least in part based on the user's response to the feedback, the system automatically refines the conversational experience by gaining intelligence over time. The feedback from the system improves over time.

In a further exemplary embodiment, a user may click on a microphone icon and speak to the system. Again, NLP is capable of understanding the user's message and, in some cases, sentiment. In response, the appropriate feedback may be generated for the user. At least in part based on the user's response to feedback, the system automatically refines the conversational experience by gaining intelligence over time. The feedback from the system improves over time.

In yet further exemplary embodiments, a conversational experience may include a user capturing and sending a photo from a client device to further enhance the conversational experience. For example, a customer support conversational experience could be more efficient with a photo from the customer and the system's ability to recognize it and provide feedback to the customer.

Figure 5:
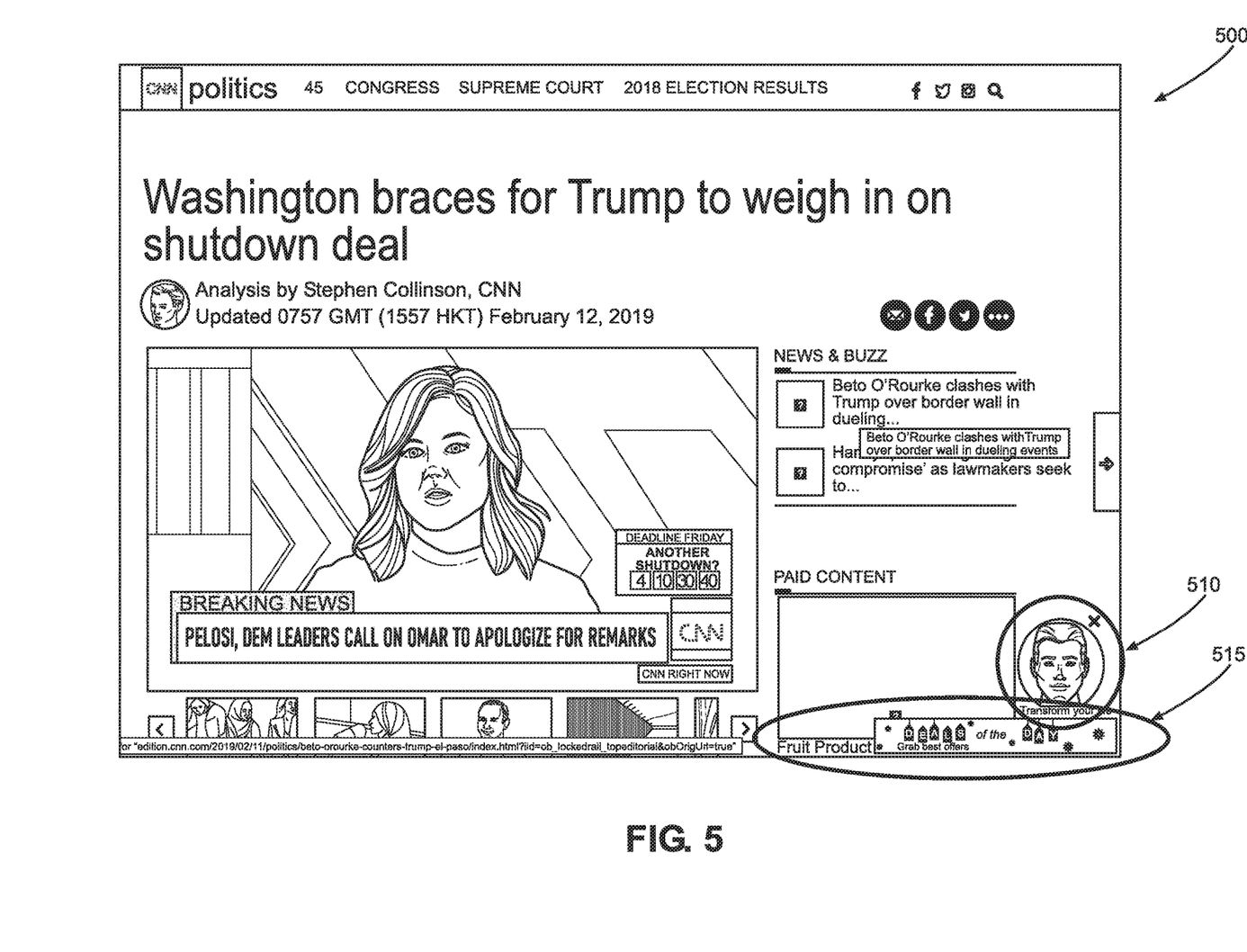
FIG. 5 is a fourth exemplary view of an interactive conversational graphical user interface.

FIG. 5 is a fourth exemplary view of an interactive conversational graphical user interface 500. Shown are personalized icon 510 and targeted ad 515. Also shown is news video content.

According to various exemplary embodiments, an engagement analyzer, which, for example, is a plug-in on CNN, and is associated with a brand page, such as the Tony Robbins® brand, performs a sentiment and intent analysis anytime that brand gets any interaction (e.g., an emoji, a comment, etc.). As a result, the brand receives a powerful dashboard created by the system.

Figure 6:
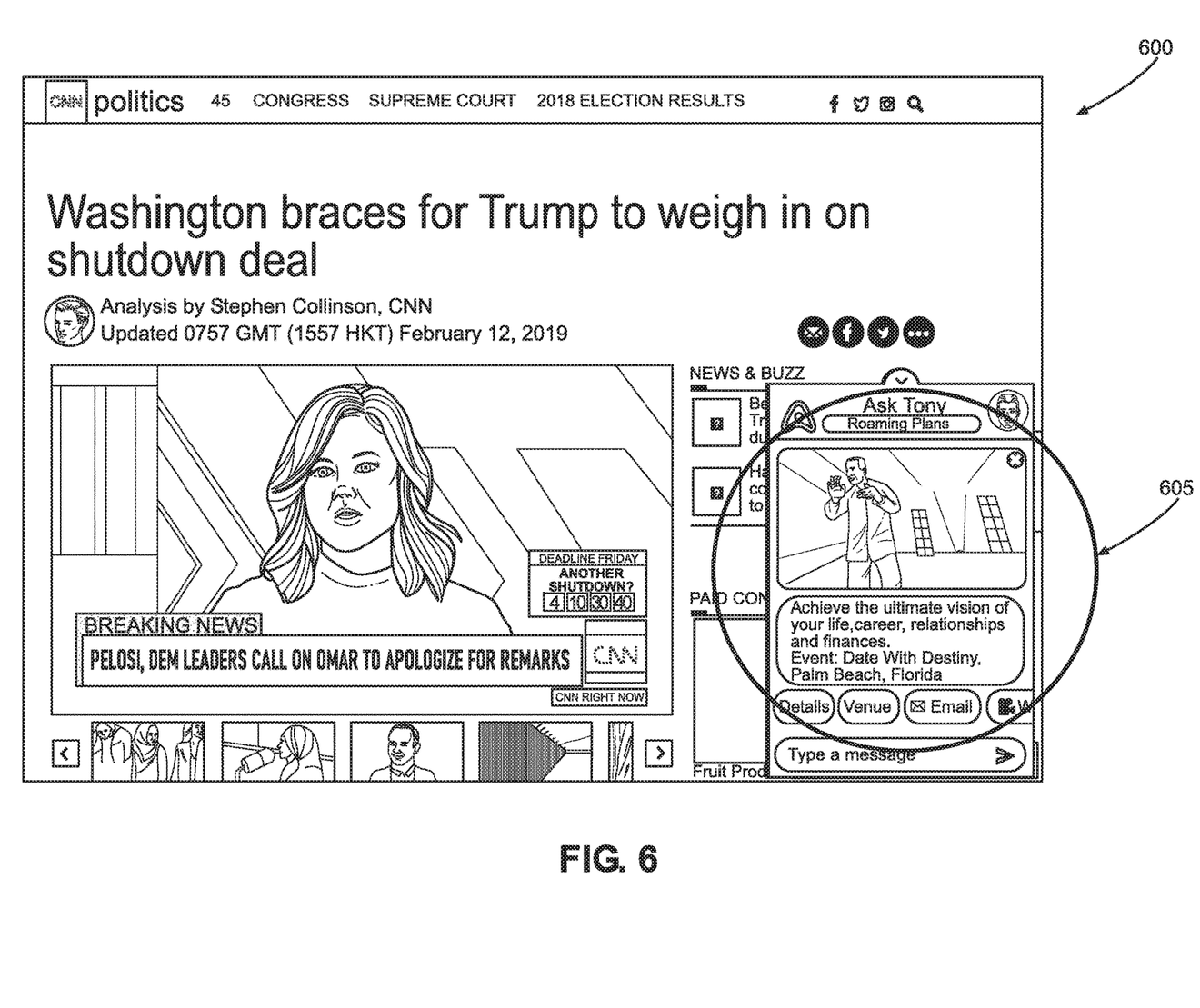
FIG. 6 is a fifth exemplary view of an interactive conversational graphical user interface.

FIG. 6 is a fifth exemplary view of an interactive conversational graphical user interface 600. Shown is conversational experience 605.

FIG. 6 shows FIG. 5 when the chat is initiated. In most exemplary embodiments, the chat is persistent—for example, it may resume from the consumer's last chat session. It has been observed that consumers have become accustomed to this click-bait-driven advertising and engaging the customers in a conversational experience.

The system also creates custom audience segments. For example, for everyone that likes the Tony Robbins® brand, the next ad shown is from Tony Robbins saying, "Hey, thanks for liking us. Would you like to do X?"

The next step, according to various exemplary embodiments, the system creates a comment responder. For example, if a fan of Tony Robbins says, "Tony, you're looking very presidential," the system moves this conversation from a very busy feed to the fan's Facebook messenger. Thus, the fan is being opted into a new channel of communication for Tony Robbin's team, and once the fan is opted in, the system can push messages to the fan at will. It is a new brand channel pertaining to something affiliated with Tony Robbins. The push channel capacity is powerful because the particular brand does not have to pay for each pushed message. It is less expensive than buying more ads to try to engage the consumer. Thus, the experience is that the consumer clicks on an ad, is directed to a website, and the consumer is guided, depending on the fit and finish of that ad experience, with the consumer directly falling into a conversational experience. For example, a consumer goes from Facebook feed to Facebook messenger.

In other exemplary embodiments, a consumer may go directly from an ad posted just about anywhere on the Internet to a conversational experience, such as that previously described concerning the Tony Robbins Brand®.

In further exemplary embodiments, responsive answer(s) from the system may be automatically sent to another (e.g., second) computing device owned by the user. The responsive answer(s) may also be automatically sent to either computing device after it has been shut down for an extended period of time (e.g., 24 hours) and then re-booted. The responsive answer(s) may also be synchronized and searchable between both computing devices.

The conversation experience, according to various exemplary embodiments, may include ads. All of this may be superimposed on other websites, such as Google search results, maps, etc. In some cases, a message button may pop up, and if the consumer clicks on it, it expands to a chat experience.

As a further example, when a consumer clicks on an icon, it routes the consumer to an SMS message. The SMS message is controlled by the systems and methods described and illustrated herein, including the usage of bots. Nevertheless, it seems like a human to human conversation. In some cases, the conversation may be escalated from the system to an actual human to human conversation. In most cases, the icon sponsor is provided with a dashboard.

In most exemplary embodiments, some or all of the content shown in FIGS. 2-6 are JavaScript driven overlay from the exemplary system. In some cases, the content may be sourced from a third party server, such as Google, Facebook, Trade Desk, etc. In some cases, the third party content may be based on the consumer's past interactions with the third party and/or the consumer's location (e.g. GPS). The system may dictate the third party that may serve content on the system. For example, Facebook who has a Facebook ad audience network, may be requested by the system to serve ads on the system. The system is also customizable. For example it may request only static ads (e.g., banner ads) from the third party. Furthermore, some or all of the ads might not disappear but remain during a conversational experience. Regardless, the systems and methods described and illustrated herein manage the consumer's experience. In many cases, every pixel that is associated with the consumer experience is managed by the system, so it allows customization of what the consumer is going to see. Advantageously, the system encourages and engages masses of consumers in conversations that ordinarily could not be handled by humans due to the costs and system needs.

In other exemplary embodiments, the system may be used to collect information. For example, a website may say, "Election 2020." When the user clicks on Election 2020, the user may view the candidates, indicate the candidate the user prefers, and may also view an ad for one of the candidates.

In the description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A networked computing device comprising:
   a processor and a display screen, the networked computing device being configured to dynamically display a specific, structured interactive conversational graphical user interface paired with a prescribed functionality directly related to the interactive conversational graphical user interface's structure;
   a networked server having a processor and communicatively coupled to the computing device, the networked server including a user identification mechanism to identify a user of the networked computing device;
   the networked server configured to send a personalized icon to the user;
   the networked server including an engine configured to send content to the user;
   the networked server configured with a machine learning engine to track every interaction the user has with the content and icons and to build a deep profile for the user;
   the machine learning engine tracking interactions of other users with the content;
   the networked server configured to periodically send related content to the user via a messaging application;
   the structure configured to receive a user response;
   the user response representing a textual response or a voice response;
   the prescribed functionality utilizing natural language processing;
   the natural language processing causing transformation of the textual response into a specifically dynamic visually or audibly perceptible and responsive answer;
   the responsive answer being automatically sent to another computing device owned by the user; and
   the responsive answer being automatically sent to either computing device after it has been shut down for an extended period of time and then re-booted.

2. The networked computing device of claim 1, further comprising the networked server including a profile for the user.

3. The networked computing device of claim 2, further comprising the networked server including a sponsorship engine configured to send an advertising icon to the user.

4. The networked computing device of claim 1, further comprising the responsive answer being automatically sent to a messenger or email account belonging to the user.

5. The networked computing devices of claim 1, wherein the extended period of time is 24 hours.

6. The networked computing devices of claim 5, further comprising the responsive answer, additional user textual or audible responses and additional responsive answers being synchronized and searchable between both computing devices.

7. The networked computing devices of claim 5, further comprising each responsive answer, additional user textual or audible responses and additional responsive answers improving subsequent responsive answers provided by the networked server over time.

* * * * *